May 10, 1927.
W. MARSHALL
MOLDING STRIP
Filed June 1, 1926
1,627,915
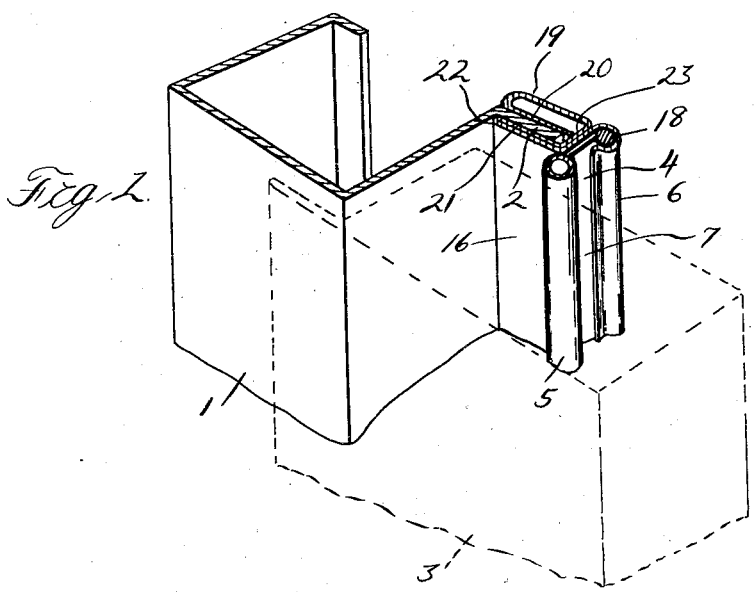
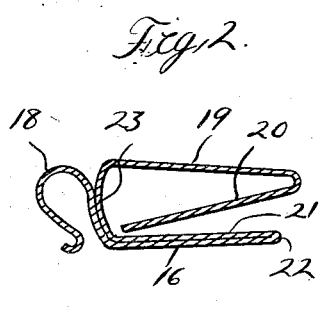
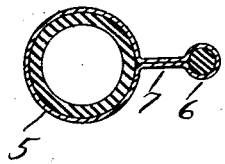
Inventor
William Marshall
By Whittemore Hulbert Whittemore
+Belknap
Attorneys Patented May 10, 1927.

1,627,915

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

MOLDING STRIP.

Application filed June 1, 1926. Serial No. 112,951.

This invention relates generally to metal strips of molding designed for use in vehicle bodies, and consists of certain novel features of construction, combinations and arrangements of parts as will be more fully described and particularly pointed out in the appended claims.

In the accompanying drawings:

Figure 1 is a fragmentary perspective view of a molding strip embodying my invention secured to a door jamb;

Figure 2 is a sectional view through the molding;

Figure 3 is a sectional view through the weather strip used in connection with the molding strip.

Referring now to the drawings in which like characters of reference designate corresponding parts throughout the several views, the numeral 1 designates a jamb, preferably of a vehicle body having a laterally extending flange 2 at its inner edge that serves as an abutment for a suitable swinging door 3. Any suitable means, such as a weather strip 4, may be used to seal the joint between the inner face of the door and the outer face of the flange 2. As shown, this strip 4 preferably comprises a sealing member 5 and a longitudinal bead 6 joined together by a web 7.

The novelty of this invention resides in the particular form of molding strip for attaching the weather strip to the jamb 1. This molding strip is designated at 16, being provided with a channel-shaped portion 17 for receiving the lateral flange 2 of the jamb, and an open return-bent portion 18 for receiving the bead 6 of the weather strip. As shown, the inner wall 19 of the channel-shaped portion 17 of the molding is provided at its forward edge with an open return-bent portion 20 that cooperates with the outer wall 21 to grip the flange 2 of the jamb. The outer wall 21 of the channel-shaped portion of the strip is also preferably provided at its forward edge with a return-bent portion 22. However, this portion 22 is preferably bent closely adjacent to the wall 21 and terminates at the rear edge of the wall 21 in the open return-bent portion 18, which preferably extends laterally inwardly from the portion 22 so that it will be disposed immediately in rear of the channel base 23. Thus it will be noted that the molding 16 is preferably formed of one strip of metal which may be bent into the desired form by any suitable means (not shown). In use, the weather strip 4 and molding 16 are preferably assembled by inserting the bead 6 into the open return-bent portion 18 which is then bent inwardly upon the bead to hold the same securely. The weather strip may then be attached quickly to the jamb 1 by merely sliding the cooperating portions 20 and 21 respectively of the channel-shaped portion of the molding transversely of the opposite sides of the lateral abutment flange 2 to the position shown in Figure 1 of the drawing. When applied to the jamb, the sealing member 5 is adapted to be compressed slightly by the door. Hence it will be apparent that the weather strip will effectively prevent wind, water, dust, etc., from entering the vehicle body from between the door and jamb. Moreover, the sealing member 5 will also effectively cushion the door and will prevent the same from rattling when in closed position.

Thus from the foregoing description, it will be readily apparent that I have provided a very simple and efficient molding strip which may be manufactured at a comparatively low cost. It will also be noted that the weather strip and molding may be easily and quickly assembled and that the latter may be readily attached to or detached from the door jamb 1. Furthermore, the construction of the molding is such that the outer portion 22 thereof will serve as a finish strip for the flange 2 of the jamb.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A strip of molding formed of a single piece of metal having a channel-shaped portion, an open return-bent portion extending from one wall thereof and into the channel portion to provide gripping means for a door jamb, and an open return-bent portion extending from the outer wall of the channel-shaped portion longitudinally of the base thereof and adapted to receive a weather strip.

2. A strip of molding having a channel-shaped portion for receiving a pillar flange, means within said channel portion cooperating with a wall thereof for securing said strip to a pillar flange, and means at the base of said channel-shaped portion for holding a weather strip.

3. A strip of molding having a channel-shaped portion designed to receive a pillar flange, compressible means within said channel portion cooperating with a wall of said channel portion for securing said strip to a pillar flange, and means outside of said channel-shape portion and upon the base thereof designed to hold a weather strip and the like.

4. A strip of molding having a channel-shaped portion for receiving a pillar flange, a return-bent flange within said channel portion cooperating with a wall of said channel portion for securing said strip to a pillar flange, and means at the base of said channel-shape portion for holding a weather strip.

5. A strip of molding having a channel-shaped portion designed to receive a portion of a door jamb, and a second channel-shaped portion designed to hold a weather strip, one side of the second mentioned portion being disposed upon the base of the first mentioned portion so that a weather strip carried by the second mentioned portion will be disposed at substantially right angles to the side walls of the first mentioned portion.

In testimony whereof I affix my signature.

WILLIAM MARSHALL.